United States Patent [19]
Yumoto

[11] Patent Number: 6,015,267
[45] Date of Patent: Jan. 18, 2000

[54] LIQUID FORCED-FEED APPARATUS HAVING A WORKING FLUID DISPERSING DEVICE

[75] Inventor: Hideaki Yumoto, Kakogawa, Japan

[73] Assignee: TLV Co., Ltd., Kakogawa, Japan

[21] Appl. No.: 08/908,391

[22] Filed: Aug. 7, 1997

[30] Foreign Application Priority Data

Aug. 13, 1996 [JP] Japan .................................. 8-232578

[51] Int. Cl.[7] ...................................................... F04F 1/06
[52] U.S. Cl. .............................. 417/54; 417/133; 137/449
[58] Field of Search .............................. 417/54, 126, 132, 417/133, 134, 135, 130; 137/449, 549

[56] References Cited

U.S. PATENT DOCUMENTS

| | | | |
|---|---|---|---|
| 1,549,566 | 8/1925 | Bain | 137/165 |
| 1,657,679 | 1/1928 | Knudstrup | 137/165 |
| 1,672,610 | 6/1928 | Goff | 137/165 |
| 2,095,485 | 3/1937 | Bassett | 137/418 |
| 2,258,295 | 10/1941 | Merz | 137/111 |
| 2,682,889 | 7/1954 | McLaughlin | 137/449 |
| 3,748,837 | 7/1973 | Billeter | 55/418 |
| 3,893,473 | 7/1975 | Breece | 137/171 |
| 4,959,141 | 9/1990 | Anderson | 210/109 |
| 5,080,126 | 1/1992 | DeRycke et al. | 137/209 |
| 5,141,405 | 8/1992 | Francart, Jr. | 417/133 |
| 5,401,142 | 3/1995 | Yumoto | 417/132 |
| 5,445,501 | 8/1995 | Yumoto | 417/133 |
| 5,655,888 | 8/1997 | Yumoto | 417/132 |
| 5,775,560 | 5/1998 | Yumoto | 417/133 |

*Primary Examiner*—Charles G. Freay
*Attorney, Agent, or Firm*—Kenyon & Kenyon

[57] ABSTRACT

A cylindrical perforated member is mounted between a working fluid inlet port and a hermetic vessel that a working fluid supplied into the hermetic vessel at the working fluid inlet port will not directly contact the forced-feed liquid surface. At the working fluid inlet port is mounted a ring-shaped member with a divergent section having the smallest flow passage area. The working fluid stream is deflected and dispersed by the cylindrical perforated member, to produce a pressure for feeding the liquid rapidly within the hermetic vessel, thus enabling the rapid forced-feed of the liquid.

13 Claims, 5 Drawing Sheets

LIQUID FORCED-FEED APPARATUS HAVING A WORKING FLUID DISPERSING DEVICE

BACKGROUND OF THE INVENTION

1. Field of the Invention

The present invention relates to a liquid forced-feed apparatus for feeding a liquid, such as water, hot water, fuel, etc., under pressure using high-pressure steam or compressed air as the motive fluid. The liquid forced-feed apparatus of the present invention is particularly suitable for use as an apparatus collecting condensate generated in a steam piping system, and then sending the condensate to a boiler or a waste heat recovery system.

1. Description of the Prior Art

The condensate generated as a result of condensation of steam in a steam piping system, or various other types of equipment using steam, in most cases still has a considerable quantity of heat. Therefore it has been a widespread practice to use a condensate recovery system for effective utilization of this thermal energy, by collecting the condensate having a large quantity of heat in a liquid forced-feed apparatus and sending the collected condensate to the boiler or the waste heat recovery system, for effective utilization of the stored thermal energy.

The liquid forced-feed apparatuses used in prior art condensate recovery systems collect the condensate in a hermetic vessel, and introduce a high-pressure working or motive fluid, such as steam, compressed air, or other fluids, into the hermetic vessel by operating a change-over valve. The liquid forced-feed apparatuses discharge the condensate from inside of the hermetic vessel under the pressure of the working fluid and at the same time supply the condensate to a condensate recovery section.

This type of liquid forced-feed apparatus has been disclosed, for instance, in Japanese Utility Model Publication No. 37-22378.

The liquid forced-feed apparatus described above will be explained with reference to FIGS. 1 and 2. FIG. 1 is a general perspective view, partly sectioned, of the liquid forced-feed apparatus of the prior art. FIG. 2 is an enlarged sectional view of a valve section of the liquid forced-feed apparatus of the prior art. In these drawings, reference numeral 100 refers to a liquid forced-feed apparatus. The liquid forced-feed apparatus 100 incorporates a float 120 and a working steam inlet valve 110, which are built in a hermetic vessel 101.

The hermetic vessel 101 is provided with a forced-feed liquid inflow port 102 and a forced-feed liquid outflow port 103, which are fitted with check valves 105 and 106 respectively. The check valve 105 is mounted in a direction allowing the liquid to flow into the hermetic vessel 101, while the check valve 106 is mounted in a direction allowing the liquid to be discharged out from the hermetic vessel 101.

In the top of the hermetic vessel 101 are formed the working steam inlet port 108 and the working steam outflow port 109, where, as shown in FIGS. 1 and 2, a working steam inlet valve 110 and a working steam discharge valve 111 are mounted. Here, the working steam inlet valve 110 and the working steam discharge valve 111 are opened and closed by moving the valve lifting rods 112 and 113 up and down. The working steam inlet valve 110 is opened when the valve lifting rod 112 is raised, while the working steam discharge valve 111 is closed when the valve lifting rod 113 is raised. The valve lifting rods 112 and 113 are connected in parallel by a connecting plate 115. The working steam inlet valve 110 and the working steam discharge valve 111 are simultaneously opened and closed by moving the connecting plate 115 up and down.

In the prior art liquid forced-feed apparatus 100 the forced-feed liquid inflow port 102 is connected to a steam load (a condensate generating section), via the check valve 105, and the forced-feed liquid outflow port 103 is connected to an apparatus using or recovering waste heat, via the check valve 106. The working steam inlet port 108 is connected to a high-pressure steam source, thereby providing a working fluid. In the liquid forced-feed apparatus 100, when no condensate is present in the hermetic vessel 101, the float 120 is in the lower position, and the connecting plate 115 is down. Therefore, in the working steam inlet valve 110 the valve lifting rod 112 lowers, so that ball valve body 122 mounted on the top end of the valve lifting rod 112 seats on the valve seat 123 to thereby close the opening. On the other hand, in the working steam discharge valve 111, the circular valve head 127 at the top end of the valve lifting rod 113 moves away from the valve seat 128, to thereby open the working steam outflow port 109.

If condensate is generated in the steam load connected to the liquid forced-feed apparatus 100, the condensate flows into the hermetic vessel 101 via the check valve 105 and accumulates in the vessel 101. As the amount of the condensate increases, the float 120 rises. With the rise of the float 120, one end of the arm 118 also rises. If the arm 118 goes up over a specific level, a snap mechanism 140 turns over to raise the rod 121, thereby raising the connecting plate 115. When the connecting plate 115 is raised, the valve lifting rod 112 mounted to the connecting plate 115 in the working steam inlet valve 110 rises to move the valve head 122 away from the valve seat 123, thereby opening the working steam inlet port 108. In the liquid forced-feed apparatus 100, the working steam flows through the opening of the valve seat 123 and through a gap between the valve lifting rod 112 and the valve case 130, being ejected downwardly through the opening provided in the lower end of the valve case 130. At this time, the working steam discharge valve 111 is in a closed position, and therefore the pressure in the hermetic vessel 101 increases to force out the condensate through the liquid outflow port 103. In this liquid forced-feed apparatus 100, the working steam is emitted downwardly from the lower end of the valve case 130 as described above, and therefore most of the working steam is forced into direct contact with the liquid accumulated in the hermetic vessel 101.

In the prior art liquid forced-feed apparatus, because the steam as a working fluid is directly ejected in a direction toward the liquid in the hermetic vessel 101, the working fluid partly is ejected directly into the liquid in the hermetic vessel 101. Steam, when used as the working fluid, therefore is ejected and flows into the cooler liquid, resulting in the steam being condensed. Therefore, the pressure in the hermetic vessel takes time before increasing to a high enough level to force feed the liquid from the hermetic vessel 101, because the steam pressure is reduced by condensation caused by contact of the steam with the cooler liquid. Consequently time is required for liquid to be fed from the hermetic vessel 101.

SUMMARY OF THE INVENTION

It is an object of the present invention to provide a liquid forced-feed apparatus capable of rapidly increasing the pressure in the hermetic vessel upon opening of the working fluid inlet port, to thereby force-feed the liquid from the hermetic vessel within a short period of time.

It is another object of the present invention to provide a liquid forced-feed apparatus which is usable in a wide range of working fluid pressures from low to high for the steam, compressed air, etc. flowing in at the working fluid inlet port. The liquid forced-feed apparatus provided by the present invention includes a working fluid deflecting and dispersing device which prevents the direct contact of the working fluid with the liquid surface when the working fluid inlet port is opened by the changeover valve, so that the liquid forced-feed apparatus can deflect and disperse the working fluid within the hermetic vessel.

According to other characteristic of the present invention, the liquid forced-feed apparatus includes a working fluid inlet port having a small cross-sectional area and a divergent section where the flow passage gradually spreads from the smallest cross-sectional area section of the working fluid inlet port, and is designed to open and close the working fluid inlet port in the smallest sectional area section.

BRIEF DESCRIPTION OF THE DRAWINGS

The above and another objects and characteristics of the embodiment of the present invention will be described with reference to the accompanying drawings, in which.

DETAILED DESCRIPTION OF THE INVENTION

Figure 1:
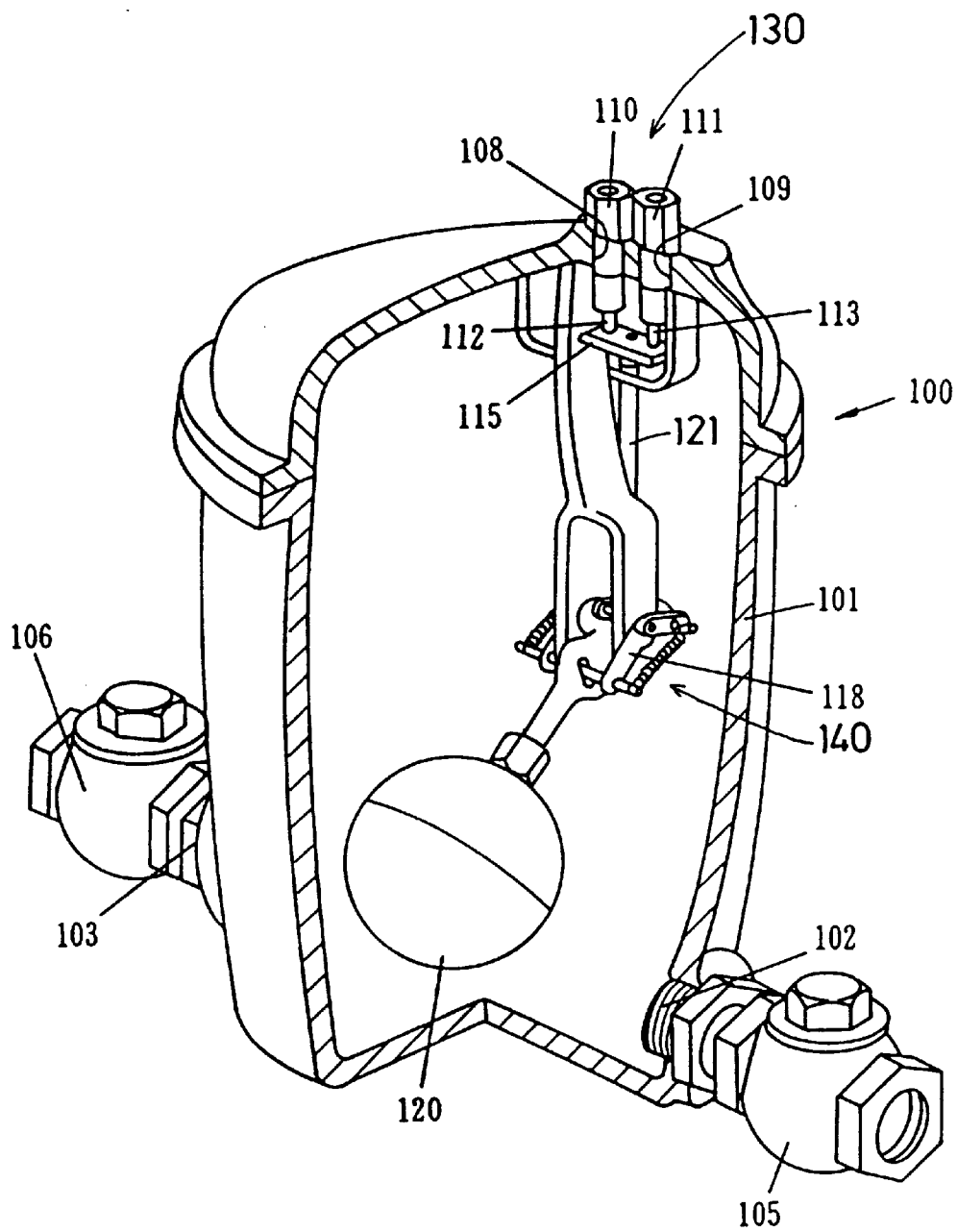
FIG. 1 is a partly sectioned perspective view showing a prior art liquid forced-feed apparatus.
Figure 2:
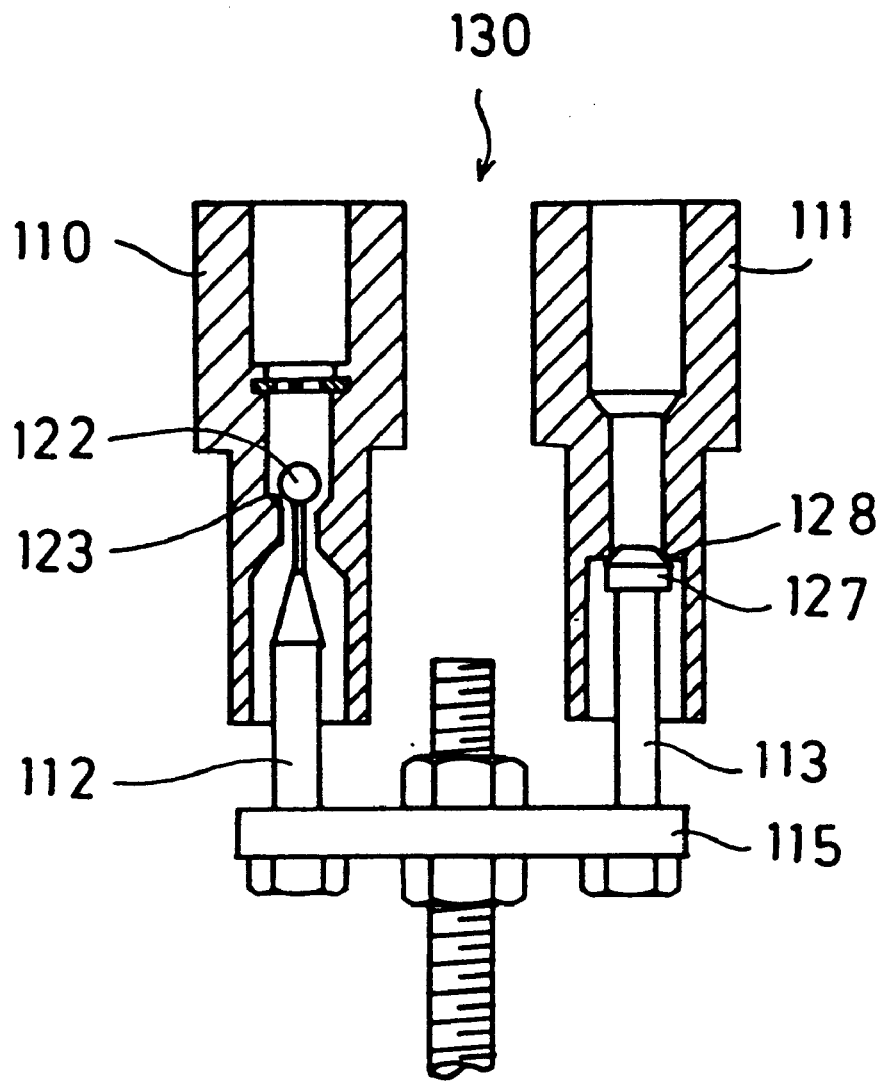
FIG. 2 is an enlarged sectional view of a valve section of the liquid forced-feed apparatus of FIG. 1.
Figure 3:
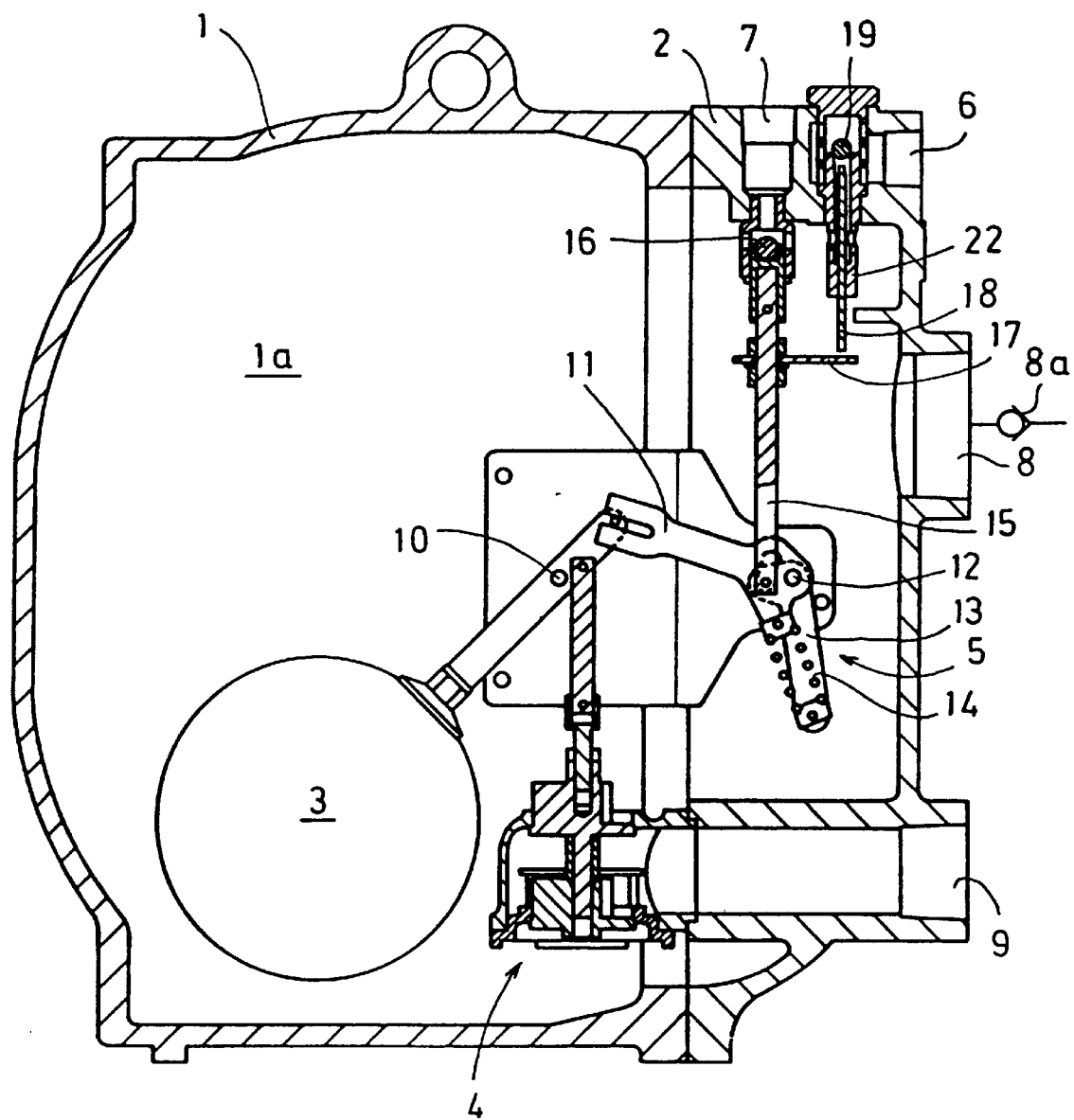
FIG. 3 is a general sectional view showing a first embodiment of a liquid forced-feed apparatus of the present invention.

A preferred embodiment of a liquid forced-feed apparatus according to the present invention will now be described by referring to the accompanying drawings. As shown in FIG. 3, in the liquid forced-feed apparatus of the present invention includes a hermetic vessel 1a, a body 1 and a cover 2. Within the apparatus a float 3, a float valve 4, and a snap mechanism section 5 are arranged. A working fluid inlet port 6, a working fluid outflow port 7, a forced-feed liquid inflow port 8, and a forced-feed liquid outflow port 9 are provided in the cover 2. The forced-feed liquid inflow port 8 is connected to an appropriate forced-feed liquid generating source (not shown) via a check valve 8a which permits the flow of the liquid only into the hermetic vessel 1a.

The float 3 is arranged so as to move up and down on the center of the fulcrum 10, to thereby move the float valve 4 of a double valve mechanism up and down to close and open the forced-feed liquid outflow port 9 with respect to the interior of the hermetic vessel 1a, and to move the first lever 11 up and down around the fulcrum 12. A second lever 13 is disposed to rotate on the fulcrum 12. Between the end of the second lever 13 and the end of the first lever 11 a coil spring 14 is mounted, in a compressed state. An operating rod 15 is connected to the upper part of the second lever 13.

On the upper portion of the operating rod 15 a ball-shaped outflow valve body 16 for opening and closing the working fluid outflow port 7 is mounted. On the middle of the operating rod 15 an operating lever 17 is mounted. The upper portion of the operating lever 17 is adjacent a working fluid inlet rod 18, which is vertically movably mounted. Above the upper portion of the working fluid inlet rod 18 a freely-moving ball-shaped working fluid inlet valve body 19 is disposed.

The condensate generated in a steam piping system and in an apparatus using steam (not shown) goes into the hermetic vessel 1a from the forced-feed liquid inflow port 8 via a check valve 8a. As the liquid level in the hermetic vessel 1a rises, the float 3 also rises, thereby slightly opening the float valve 4. With further rise of the liquid level, the float 3 continues to rise finally snapping the snap mechanism 5 to move the operating rod 15 instantly upward. With the upward movement of the operating rod 15, the working fluid outflow port 7 is closed by the working fluid outflow valve body 16 and at the same time the working fluid inlet port 6 is opened by the working fluid inlet rod 18, thereby allowing a working fluid, such as high-pressure steam or compressed air, to flow into the hermetic vessel 1a and thus forcing out the accumulated liquid via the float valve 4 and the forced-feed liquid outflow port 9.

Figure 4:
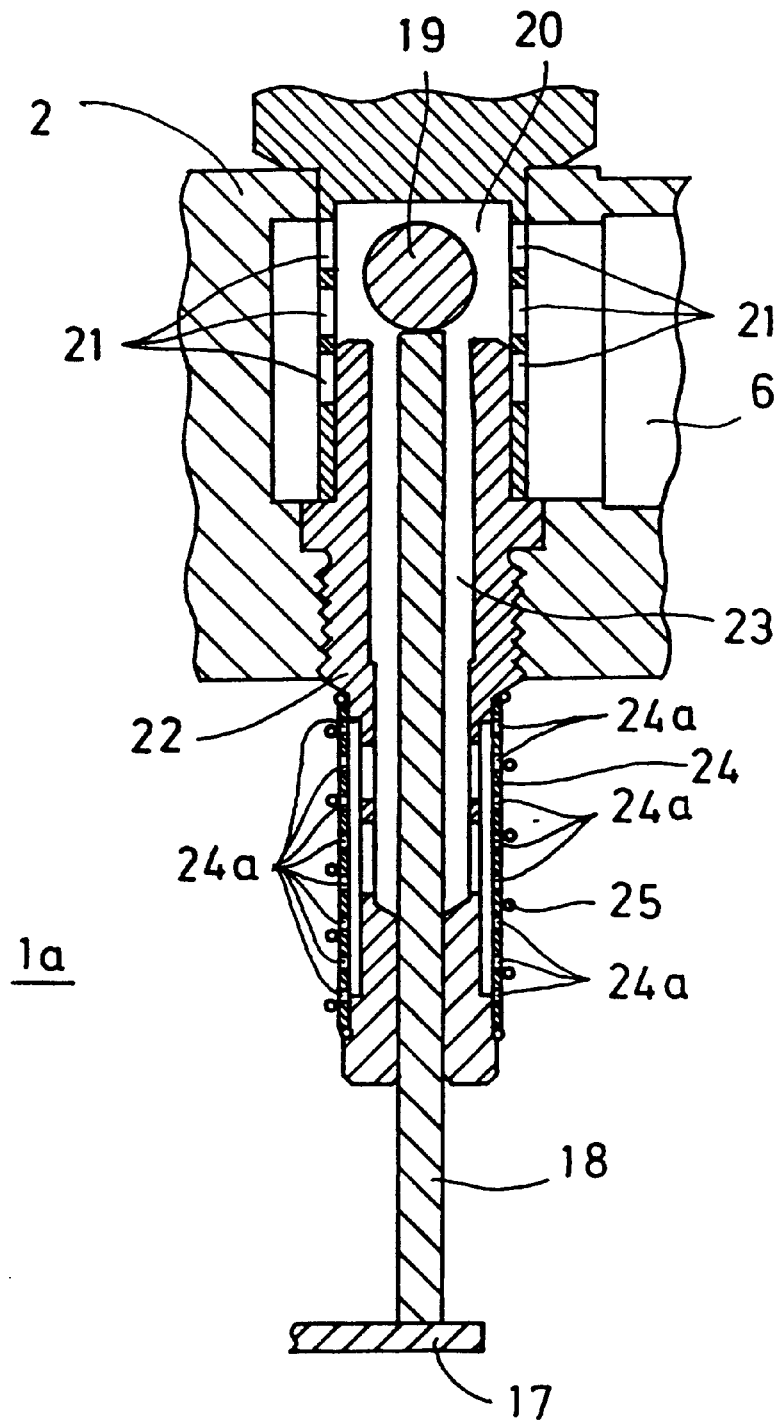
FIG. 4 is a partly enlarged sectional view of a primary portion of the present invention.

The working fluid inlet port 6, as shown in FIG. 4, is connected to the inlet valve chamber 20 in which the freely-moving working fluid inlet valve body 19 is disposed through an inlet valve chamber 20 and passages 21. Furthermore, the working fluid inlet port 6 is connected to the interior of the hermetic vessel 1a through a straight pipe section 23 of the inlet port member 22 and a cylindrical perforated member 24. The straight pipe section 23 includes lateral openings, substantially parallel to the surface of condensate in the vessel 1a, leading to perforated member 24. The cylindrical perforated member 24 has a multitude of small-diameter pores 24a, and preferably has a larger passage area than the passage area of the straight pipe section 23. On the outer periphery and the lower end section of the cylindrical perforated member 24, a coil spring 25 is mounted to secure the cylindrical perforated member 24 to the inlet port member 22.

The working fluid inlet valve body 19, as shown in FIG. 4, is of such a design that, with the upward movement of the working fluid inlet rod 18, the straight pipe section 23 is connected to the inlet valve chamber 20, to thereby supply the high-pressure working fluid from the working fluid inlet port 6 into the hermetic vessel 1a.

The steam to be supplied from the straight pipe section 23 into the hermetic vessel 1a is divided into many streams by the multitude of small-diameter pores 24a while passing through the cylindrical perforated member 24, and therefore the steam stream is diverted in the horizontal direction substantially parallel to the surface of condensation in the vessel 1a. Thus, the steam stream does not condense because it does not come into direct contact with the cooler surface of the forced-feed liquid in the hermetic vessel 1a. As a result, the steam spreads around the entire upper area of the forced-feed liquid in the vessel 1a, to build up a pressure sufficient for rapid forced-feeding of the liquid, and is not ejected directly into the condensate.

Figure 5:
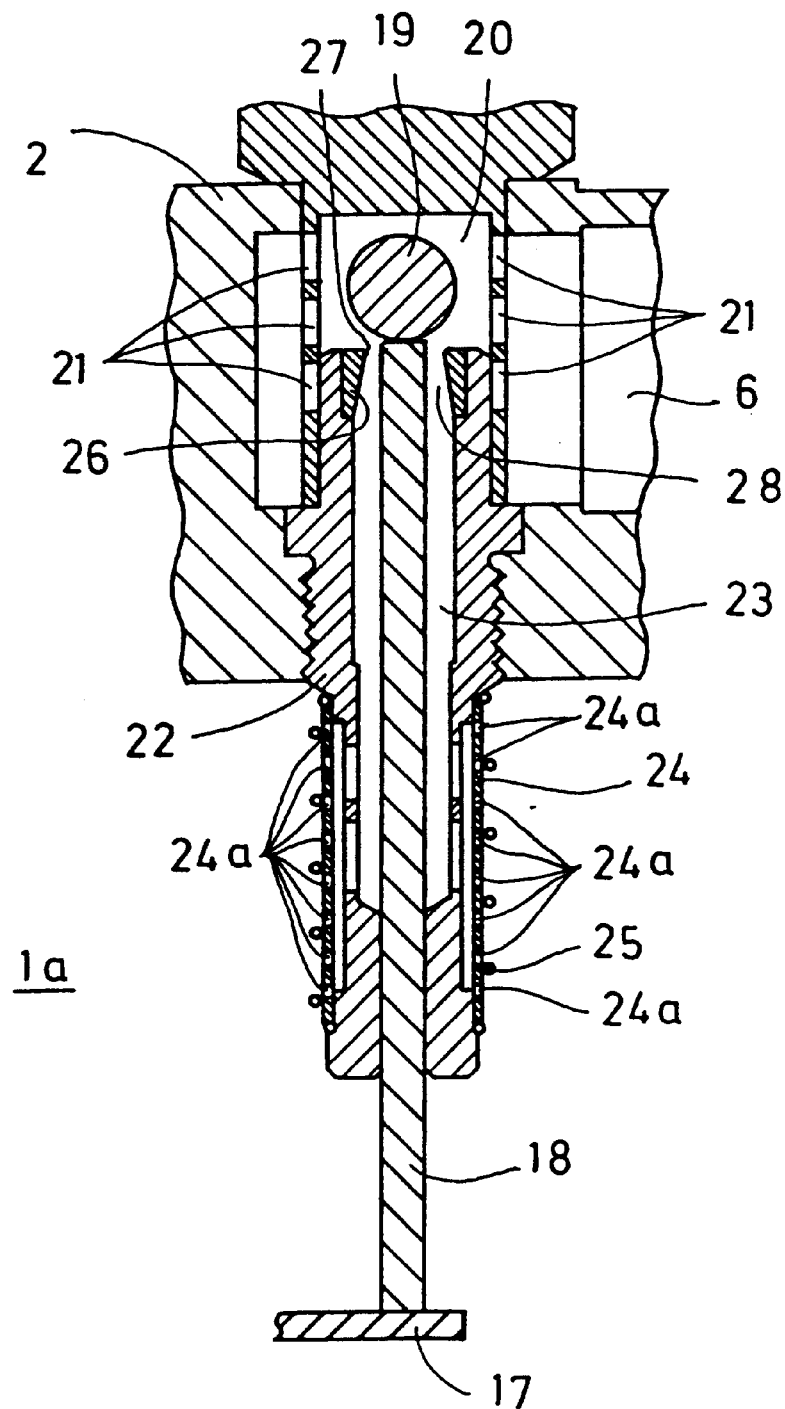
FIG. 5 is a sectional view of a primary portion of a second embodiment of the liquid forced-feed apparatus of the present invention.

In FIG. 5, a second embodiment of the working fluid inlet port 6 of the present invention is shown, which also has the passage 21, the inlet valve chamber 20, the straight pipe section 23, and the cylindrical perforated member 24, and is connected to the hermetic vessel 1a in a manner similar to the embodiment shown in FIG. 4. In the embodiment of FIG. 5, a ring-shaped member 26 is mounted on the upper end of the straight pipe section 23, so that the upper end 27 of the ring-shaped member 26 has the smallest cross-sectional area, and the upper end 27 serves as a valve seat section on which the working fluid inlet valve body 19 is seated. The inner peripheral surface 28 of the ring-shaped member 26 has a divergent section gradually expanding as the flow direction. The flow passage extends from the smallest cross-sectional area section of the upper end 27 to the hermetic vessel 1a via the divergent inner peripheral surface 28, the straight pipe section 23, and the cylindrical perforated member 24.

In the embodiment of FIG. 5, when the working fluid inlet valve body 19 moves away from the upper end 27 of the ring-shaped member 26, the surface receiving a high working fluid pressure becomes smaller in area by the amount of decrease in the sectional area of the upper end 27. Even when high working fluid pressure is used, therefore, it is possible to move the working fluid inlet valve body 19 away from the upper end 27 to open the valve by the driving force of the operating rod 15 and the working fluid inlet rod 18.

In the embodiment of FIG. 5, the ring-shaped member 26 is mounted, but the ring-shaped member is not used in the embodiment of FIG. 4. Because of the use of the ring-shaped member 26, the cross-sectional area of the upper end 27 shown in FIG. 5 is smaller than that of the upper end shown in FIG. 4. Because of the smaller cross-sectional area, the force required to urge the working fluid inlet valve body 19 upward is smaller. In order to urge the working fluid inlet body 19 upward, a force equal to the product of the pressure on the upper end 27 and the cross-sectional area of the upper end 27 is required. Thus, the smaller the cross-sectional area, the smaller the force required to urge the valve body 19 upward. This means that as the upper end 27 has a smaller cross-sectional area, the same force can move the valve body 19 upward against a larger pressure. Thus, because of the use of the ring-shaped member 26, which permits the use of a smaller cross-sectional area for the upper end 27, the apparatus can operate properly at higher pressures for the working fluid with the same force applied to the valve body 19 to urge it upward. Accordingly, the apparatus shown in FIG. 5 can operate well at a working fluid pressure higher than the apparatus of FIG. 4.

Furthermore in the embodiment of FIG. 5, the flow velocity of the high-pressure steam is reduced, and the steam is dispersed, by the cylindrical perforated member 24. In FIG. 5, while the working fluid is flowing from the inlet port 6 down to the straight pipe section 23, the fluid velocity increases because of the narrowed path provided by the smaller cross-sectional area of the upper end 27 of the ring-shaped member 26. Thereafter, the velocity decreases, resulting in restoration of fluid pressure, while the fluid is flowing from the straight pipe section 23 into the hermetic vessel. Therefore, high-pressure steam that has passed the upper end 27 of the smallest cross-sectional area flows down through the divergent inner peripheral surface 28, to thereby change the velocity energy of the high-pressure steam into a pressure energy. As is know under Bernoulli's equation, as the velocity of the high-pressure steam decreases as the cross-sectional area increases, the pressure of the high-pressure steam will increase. The high-pressure steam thus reaches the upper part of the forced-feed liquid within the hermetic vessel 1a. The high-pressure steam achieves a great pressure so as to force-feed the liquid from the vessel 1a at a high velocity without the steam going down under the liquid surface and condensing.

As the liquid level within the hermetic vessel 1a lowers with the forced-feed of liquid, the float 3 also goes down-ward. When the float 3 has reached a certain lower position, the snap mechanism 5 snaps again to the opposite side, thereby closing the working fluid inlet port 6 and opening the working fluid outflow port 7 as shown in FIG. 3. Thus the float valve 4 is closed to stop force-feeding the liquid. At the same time, the liquid flows down again from the forced-feed liquid inflow port 8 into the hermetic vessel 1a, repeating the above-described cycle of operation.

A liquid forced-feed apparatus capable of feeding a liquid with force from a hermetic vessel in a short period of time is provided by the present invention as described above. It should be noticed that the above embodiment has been given only as an instance and therefore the present invention is not limited to the embodiment described above. And it is clear that various changes can be made without departing from the spirit and scope of the present invention claimed in claims as will now be understood by those skilled in the art. For instance, in the above embodiment, the cylindrical porous member has been used to deflect and disperse the working fluid, but the shape is not limited to a cylinder; for instance it is possible to deflect or disperse the working fluid by the use of a deflecting plate or a multilayer meshed member. In addition, the working fluid could be dispersed in any direction between a direction substantially parallel to the liquid surface to a direction which is perpendicular to, and away from, the liquid surface.

What is claimed is:

1. A liquid forced-feed apparatus, comprising:
   a vessel having a working fluid inlet port, a working fluid outflow port, a forced-feed liquid inflow port, and a forced-feed liquid outflow port;
   a liquid level detecting device for detecting a liquid level of a liquid surface within the vessel;
   a changeover valve connected to the liquid level detecting device, the changeover valve closing the working fluid outflow port when the working fluid inlet port is opened, the changeover valve opening the working fluid outflow port when the working fluid inlet port is closed; and
   a working fluid dispersing device mounted between the working fluid inlet port and the interior of the vessel, the working fluid dispersing device dispersing fluid flowing from the working fluid inlet port away from the liquid surface, thereby preventing direct contact of the working fluid with the liquid surface within the vessel when the working fluid is fed into the vessel from the working fluid inlet port.

2. The liquid forced-feed apparatus of claim 1, wherein: the working fluid dispersing device comprises a perforated member.

3. The liquid forced-feed apparatus of claim 2, wherein: the perforated member is cylindrical.

4. The liquid forced-feed apparatus of claim 1, wherein: the working fluid dispersing device is mounted on the working fluid inlet port using a coil spring.

5. A liquid forced-feed apparatus, comprising:
   a vessel having a working fluid inlet port, a working fluid outflow port, a forced-feed liquid inflow port, and a forced-feed liquid outflow port;
   a liquid level detecting device for detecting a liquid level of a liquid surface within the vessel;
   a changeover valve connected to the liquid level detecting device, the changeover valve closing the working fluid outflow port when the working fluid inlet port is opened, the changeover valve opening the working fluid outflow port when the working fluid inlet port is closed; and a working fluid inlet valve body and a working fluid inlet valve seat located at the working fluid inlet port;

the working fluid inlet valve seat comprising the smallest cross-sectional area of the working fluid inlet port.

6. The liquid forced-feed apparatus of claim 5, further comprising:

a working fluid inlet valve body and a working fluid inlet valve seat located at the working fluid inlet port; the working fluid inlet port comprising a divergent section located downstream of the working fluid inlet valve seat.

7. The liquid forced-feed apparatus of claim 5, further comprising:

a ring-shaped member mounted in the working fluid inlet port.

8. The liquid forced-feed apparatus of claim 7, wherein:

the ring-shaped member comprises a divergent section expanding in a direction of working fluid flow.

9. A method of force feeding liquid, comprising:

providing a vessel having a working fluid inlet port, a working fluid outflow port, a liquid inflow port, and a liquid outflow port, a liquid level detecting device for detecting a liquid level of a liquid surface within the vessel and a changeover valve connected to the liquid level detecting device, the changeover valve closing the working fluid outflow port when the working fluid inlet port is opened, the changeover valve opening the working fluid outflow port when the working fluid inlet port is closed;

feeding a liquid into the vessel through the liquid inflow port to thereby provide the liquid surface;

detecting the liquid level of the liquid surface;

closing the working fluid outflow port and opening the working fluid inlet port when the liquid level is higher than a predetermined level to thereby allow a working fluid to flow into the vessel; and dispersing the working fluid flowing from the working fluid inlet port away from the liquid surface, thereby preventing direct contact of the working fluid with the liquid surface within the vessel when the working fluid is fed into the vessel from the working fluid inlet port.

10. The method of claim 9, wherein:

the dispersing includes passing working fluid from the working fluid inlet port through a perforated member.

11. The method of claim 9, wherein:

the dispersing includes dispersing the working fluid in a direction substantially parallel to the liquid surface.

12. The method of claim 9, wherein:

the dispersing includes dispersing the working fluid between a direction substantially parallel to the liquid surface and a direction which is perpendicular to, and away from, the liquid surface.

13. A method of force feeding liquid, comprising:

providing a vessel having a working fluid inlet port, a working fluid outflow port, a liquid inflow port, and a liquid outflow port, a liquid level detecting device for detecting a liquid level of a liquid surface within the vessel and a changeover valve connected to the liquid level detecting device, the changeover valve closing the working fluid outflow port when the working fluid inlet port is opened, the changeover valve opening the working fluid outflow port when the working fluid inlet port is closed;

feeding a liquid into the vessel through the liquid inflow port to thereby provide the liquid surface;

detecting the liquid level of the liquid surface;

closing the working fluid outflow port and opening the working fluid inlet port when the liquid level is higher than a predetermined level to thereby allow a working fluid to flow into the vessel;

passing the working fluid through a divergent section; and dispersing the working fluid flowing from the working fluid inlet port away from the liquid surface, thereby preventing direct contact of the working fluid with the liquid surface within the vessel when the working fluid is fed into the vessel from the working fluid inlet port.

* * * * *